United States Patent [19]
Bareis et al.

[11] Patent Number: 5,771,689
[45] Date of Patent: Jun. 30, 1998

[54] PIPE EVAPORATOR FOR FEEDING ADDITIONAL FUEL INTO THE EXHAUST GAS

[75] Inventors: Marc Bareis, Markgoeningen; Horst Harndorf, Schwieberdingen; Thomas Theml, Eberdingen-Hochdorf, all of Germany

[73] Assignee: Robert Bosch GmbH, Stuttgart, Germany

[21] Appl. No.: 752,949
[22] Filed: Nov. 21, 1996

[30] Foreign Application Priority Data

Jun. 26, 1996 [DE] Germany .................. 196 25 447.7

[51] Int. Cl.⁶ .................. F01N 3/20; F01N 3/36; B01D 53/94
[52] U.S. Cl. .................. 60/286; 60/301; 60/303
[58] Field of Search .................. 60/284, 286, 301, 60/303

[56] References Cited

U.S. PATENT DOCUMENTS 5,209,061  5/1993  Takeshima .................. 60/284 X

FOREIGN PATENT DOCUMENTS 309723   4/1989  European Pat. Off. .................. 60/303
3632696  4/1988  Germany .................. 60/303

Primary Examiner—Tony M. Argenbright
Attorney, Agent, or Firm—Edwin E. Greigg; Ronald E. Greigg

[57] ABSTRACT

A device for re-treating exhaust gases of an internal combustion engine is proposed, in which to promote the efficiency of a downstream reducing catalytic converter, fuel is metered via a metering valve and introduced into the exhaust system via an evaporator device. A metal sheath is provided with a sheathed glow-plug element that is used as the evaporator device and via a flow opening on a face end introduces an evaporated reducing agent into the exhaust gas stream.

20 Claims, 2 Drawing Sheets

PIPE EVAPORATOR FOR FEEDING ADDITIONAL FUEL INTO THE EXHAUST GAS

BACKGROUND OF THE INVENTION

The exhaust gases of self-igniting internal combustion engines, because of the fact that they are operated with high air excess, tend to produce high $NO_x$ emissions. This occurs to an increased extent in engines with direct injection into the combustion chamber. In order to reduce these emissions, one option is to carry out $NO_x$ reduction with the aid of a suitable reducing catalytic converter. Catalytic converters based on zeolites are suitable, for example. Another problem in self-igniting engines is the relatively low exhaust gas temperature, which makes lighting off of the reduction function of such a catalytic converter more difficult.

From European Patent Disclosure EP-A 503 882, it is known to use hydrocarbon, that is, fuel, as a reducing agent, which is introduced into the exhaust system of the engine downstream of an $NO_x$ reducing catalytic converter of the zeolite type, in a manner controlled by the temperature of the catalytic converter. The metering is effected intermittently, and hydrocarbon is intended to be temporarily stored in the porous structure of the catalytic converter, so that as the catalytic converter temperature rises, this hydrocarbon is available for conversion of the $NO_x$. Along with the disadvantageous use of a magnet valve, already noted above and the attendant expense, this device also has the disadvantage that the quantity of hydrocarbon that is introduced cannot directly effect conversion of the $NO_x$ ingredients but instead first has to be prepared in the catalytic converter. Given the relatively cooler exhaust gases of a self-igniting engine, this provision is inadequate.

The point of departure for the invention is a device for re-treating exhaust gases of an internal combustion engine. In a device of this kind, known from German Patent Disclosure DE A1 44 36 415, a body embodied as a sintered part is provided as the hollow body, which accordingly has a porous wall extending over its entire length. This has the disadvantage that on the one hand the sintered part is unable to withstand the high and frequently changing temperatures during engine operation and is rapidly destroyed, and on the other, fuel can emerge over the entire length of the sintered part toward the exhaust gas side, even if it has not yet evaporated. Since heating bodies typically have a high temperature required for evaporating the supplied reducing agent, such as fuel, over only portions of their surface, the supplied fuel is not heated uniformly, either, and in particular is not heated in such a way as to guarantee that it will change to the vapor phase over the entire length of the heating body and will emerge in that phase into the exhaust pipe. This is true in particular for sheathed glow-plug elements, which as an economical, functionally reliable large-scale mass-produced product, are used advantageously here. The emergence of liquid reducing agent is deleterious to engine emissions.

OBJECT AND SUMMARY OF THE INVENTION

It is an object of the device according to the invention and an advantage over the prior art of assuring that the reducing agent to be introduced is completely evaporated before it enters the exhaust gas, and the use of a metal sheath assures that functional reliability is preserved even under extreme conditions.

In another object, a known electrically heated sheathed glow-plug element protrudes into a hollow body and maximally fills up the interior of the hollow body to serve as the heating body. Such sheathed glow-plug elements, as a large-scale mass-produced product, can be procured so as to aid in starting self-igniting engines, and they make it possible to embody the device in an inexpensive, functionally reliable way.

In yet another object, the hollow body protrudes into the core flow of exhaust gas carried by the exhaust pipe by its face end that has the flow opening. Thus very good mixing of the introduced reducing agent with the exhaust gas is attainable.

In a further object of the invention, the heating body is replaceably insertable into a securing element in which a delivery conduit to the interior of the hollow body is also disposed, so that a compact, easily installed, easily aligned, and easily repaired unit is obtained. The compactness is improved by the eccentric disposition of the hollow body and of the delivery conduit, as recited hereinafter.

According to the invention, only a very slight idle volume occurs between the metering point and the evaporation site. At times when the engine is stopped, the electrically controlled valve acts as a shutoff device. Because the idle volume between the valve and the exhaust pipe is slight, it is possible to adapt the reducing agent metering dynamically to operating parameters. After the metering has been shut off, for instance if the catalytic converter is too hot or too cold to function properly, only very little reducing agent escapes from the idle volume, for a brief time. Upon restarting, very little replenishment is accordingly needed before full operating effectiveness is attained.

The particular disposition of the electrically controlled valve, disclosed herein, which is preferably a commercially available fuel injection valve, is highly advantageous. On the one hand, this increases the compactness of the device, with the attendant advantages already mentioned, and on the other, the valve is advantageously given both a good hold and protection.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
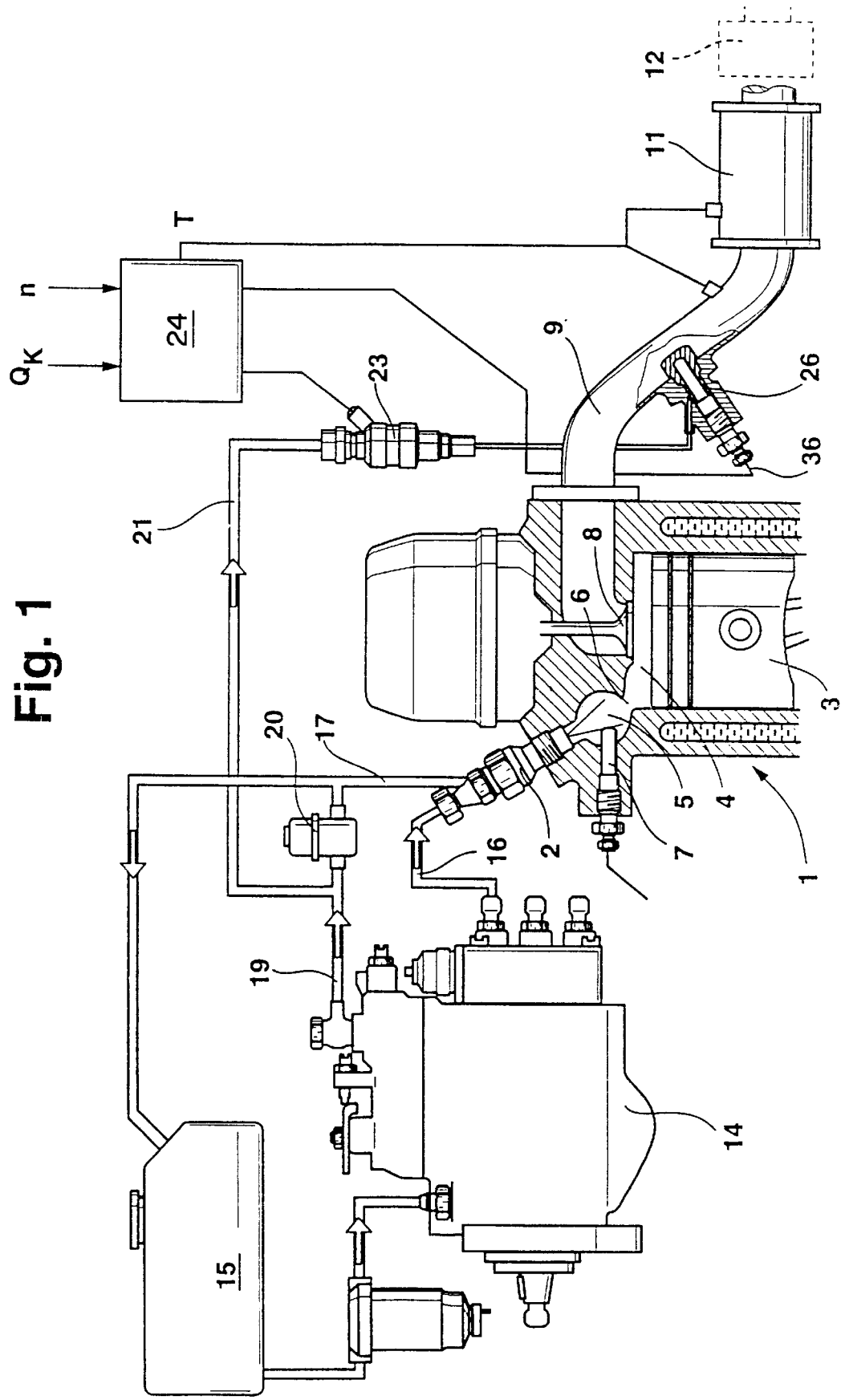
FIG. 1 schematically shows a fuel supply system of a self-igniting internal combustion engine, supplemented with the device of the invention.

What is shown of an internal combustion engine in the drawing is a section through a portion of one cylinder 1 of a self-igniting engine. This exemplary embodiment involves a self-igniting engine with indirect injection; that is, the fuel via an injection valve 2 is injected not directly into the main combustion chamber 4 bounded by the engine piston 3, but rather into a swirl chamber 5 preceding the main combustion chamber and communicating with the main combustion chamber 4 via an overflow conduit 6. A glow plug 7 protruding into this swirl chamber is provided here as an aid in starting the engine. The ingredients of injection fuel and air combusted in the swirl chamber and the main combustion chamber are thrust, after the conclusion of the expansion stroke, via an outlet valve 8 over into an exhaust conduit or exhaust pipe 9 by the expulsion stroke of the engine piston 3. The exhaust conduit 9 is as a rule embodied as an exhaust pipe elbow, comprising a plurality of conduits each leading away from an engine cylinder and merging with a manifold pipe that leads via one or more individual pipes into the open air. A reducing catalytic converter 11 is disposed in the exhaust manifold, in the example shown, and downstream of it, as represented by dashed lines, are an oxidation catalytic converter and optionally the usual muffler device of the exhaust system of an internal combustion engine.

The fuel supply to the injection valve 2 per cylinder is effected by a fuel injection pump 14, which receives fuel from a fuel tank 15 and meters the fuel, brought to high pressure, via injection lines 16 and supplies it alternatingly to one of the injection valves 2 at a time. Fuel leaving from the individual injection valves is returned to the fuel tank via leakage lines 17.

In order to pump the fuel from a tank into an internal suction chamber, the fuel injection pump communicates with a prefeed pump, not shown in further detail; typically, an rpm-dependently controlled fuel pressure is maintained in the suction chamber, in order to control rpm-dependent functions. The overflow pressure for controlling this suction chamber pressure escapes via the overflow line 19, typically without pressure, back to the fuel tank 15. In the present example, however, a pressure regulator 20 is incorporated into the overflow line 19; it can be adjusted to 0.3 bar, by way of example, so that upstream of this pressure regulator 20, a supply pressure of 0.3 bar is available. Via a fuel line 21, this pressure is supplied to an electrically controlled metering valve 23, which under the control of a control unit 24, as a function of such operating parameters as load ($Q_K$), rpm (n) and temperature of the exhaust gas and/or of the catalytic converter, supplies fuel as a reducing agent, to an evaporator device 26. This device is seated in the exhaust pipe upstream of the reducing catalytic converter 11. The construction of this evaporator device can be seen in detail in FIG. 2.

Figures 2, 3:
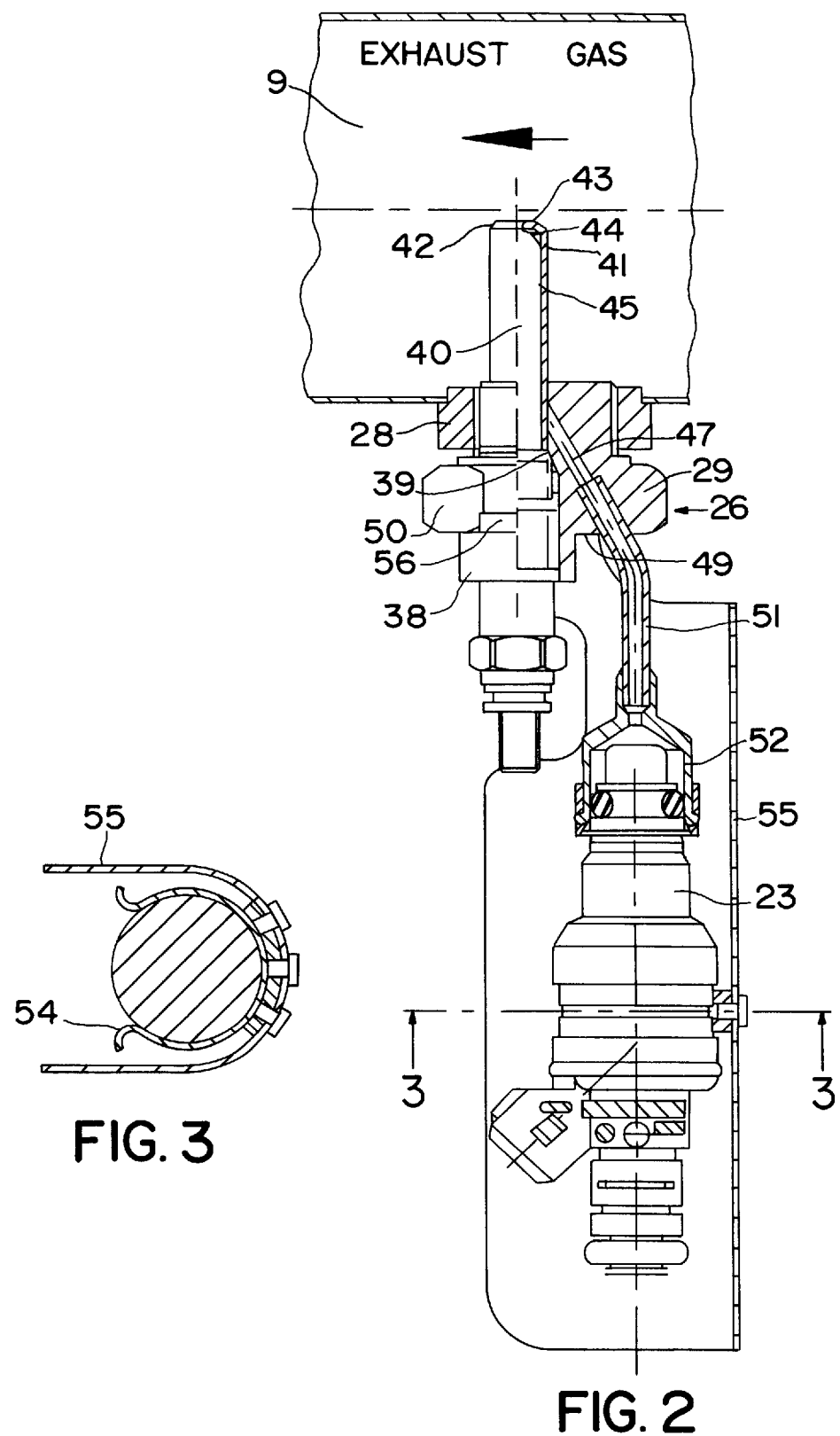
FIG. 2 shows a section through the hollow body of the invention for preparing the reducing agent.
FIG. 3 is a cross-sectional view along lines 3—3 of FIG. 2.

FIG. 2 shows the portion of the exhaust pipe or exhaust conduit 9, with the evaporator device 26, which is inserted there, shown partly in section. Located in the wall of the exhaust conduit 9 is a screw-in cuff 28, into which a threaded connector 29 can be screwed tightly. Located in this threaded connector, eccentrically to the longitudinal axis of the threaded connector, is a receptacle 38 with a female thread and a sealing seat, into which female thread a sheathed glow-plug element 40 can be screwed in order to rest tightly on an inner sealing face on the sealing seat 39. Laterally of the exhaust conduit, the receptacle merges with a hollow body 41, which comprises a cylindrical metal sheath. This hollow body 41 protrudes approximately as far as the center of the exhaust pipe, and on its face end 42 it has a through opening 43 that connects the interior 44 of the hollow body with the exhaust conduit. The interior substantially comprises an annular gap 45 formed between the sheathed glow-plug element 40 and the inner wall of the hollow body 41.

A delivery conduit 47 discharges into this annular gap 45 and leads obliquely to the hollow body 41, which is anchored in the threaded connector 29 and is preferably also embodied integrally with it. The outlet of the delivery conduit 47 from the threaded connector 29 is located on the face end 49 of the threaded connector 29 remote from the exhaust pipe 9, next to the receptacle 38, also eccentrically to the longitudinal axis of the threaded connector. The threaded connector 29 preferably has a hexagon 50, to enable it to be screwed into the screw-in cuff 28.

After emerging from the threaded connector 29, the delivery conduit 47 changes over into a short line segment 51 that originates at a receiving cup 52. The end of the metering valve 23 is inserted tightly into the receiving cup and is secured thereon with a resilient retaining clamp. The metering valve is also secured with a resilient retaining clamp 54 to a retaining baffle 55. This baffle encompasses the metering valve, which is preferably a known fuel injection valve, on three sides approximately in a U and thus protects the metering valve and its connection with the line 51 against both mechanical factors and temperature factors that can act on it from adjacent parts of the exhaust pipe 9. The retaining baffle is secured to the threaded connector 29 for instance being soldered to it at a shoulder 56, and thus together with the metering valve, the threaded connector and the hollow body 41 forms a compact, easily replaceable unit. The short line connection between the metering valve and the hollow body 41 guarantees an only slight idle volume quantity between when the metering valve opens and when the reducing agent is exported into the exhaust gas. By mounting the retaining baffle 55 on the shoulder 56, the manipulation of the screw-in connector via the hexagon 50 is also assured. The sheathed glow-plug element, being a part located eccentrically next to the injection valve 23, is also easily replaced.

This compact unit also has the functional advantages that the interior between the hollow body 41, in the form of the metal sheath, and the sheathed glow-plug element 40 has a very small volume, and that fuel introduced into this small volume, or the reducing agent, can be rapidly and intensively heated at the sheathed glow-plug element. The highest temperatures occur at the tip of the sheathed glow-plug element 40 pointing toward the flow opening 43, and the location of the flow opening guarantees that all the fuel that has entered the exhaust gas must flow past this highly heated tip of the sheathed glow-plug element, where it undergoes its evaporation.

External soiling caused by exhaust gas can be eliminated by a brief burn-off procedure, by raising the temperature of the sheathed glow-plug element to far beyond the normal operating temperature. The only slight mass of the metal sheath forming the hollow body is heated very rapidly, so that the burn-off of soot deposited there is guaranteed. Introducing the fuel into the center of the exhaust stream, and in exclusively gaseous form, prevents deposits of fuel or reducing agent on the walls and assures a homogeneous distribution of the introduced reducing agent. The metal sheath is moreover heatable to high temperatures even in continuous operation, without having to fear functional sacrifices.

Referring again to FIG. 1, heating of the sheathed glow-plug element 40 is effected via a control line 36, which leads from the control unit 24. The catalytic converter 11 is embodied as a reducing catalytic converter and serves to reduce the $NO_x$ ingredients in the engine exhaust gas. The present engine is a self-igniting internal combustion engine, which in a known manner is operated with a considerable air excess, and because of this combustion procedure has a considerable proportion of $NO_x$ ingredients in the exhaust gas. Even in an engine that uses the swirl chamber combustion process shown, this proportion is high, and it is even higher in engines in which injection is done directly into the main combustion chamber 4. Because of the high air excess, which prevails in the exhaust gas as well, and results in an extremely slight proportion of CO in the exhaust gas, a reduction of the NO$_x$ ingredients to be carried out effectively with this CO cannot be attained to a satisfactory extent. A further difficulty is that the exhaust gases of self-igniting engines have a substantially lower temperature compared with externally ignited engines with external mixture formation, and this makes the lighting-off performance of a downstream catalytic converter and high efficiency of that catalytic converter substantially more difficult. These disadvantages are counteracted by introducing a reducing agent. The introduced fuel effectively enables efficient reduction to occur in the catalytic converter. At the same time, a thermal conversion of fuel takes place in the catalytic converter, which raises the operating temperature of the catalytic converter and improves its efficiency. To that end, to increase efficiency, it is necessary that the introduced reducing agent be finely distributed and that it reach the exhaust gas in rapidly convertible form. It is also important that only the requisite quantity of reducing agent, needed for effective exhaust gas detoxification, be introduced. With the aid of the electrically controlled valve 23, with pilot control via the control unit 24, the requisite quantity of reducing agent, ascertained from the load and rpm, to suit the exhaust volume is now introduced, also taking into account the temperature T of the exhaust gas and/or of the catalytic converter.

The good preparation of the Diesel fuel used here as the reducing agent is done with the aid of the evaporator device 26, once the fuel quantity has been controlled with the aid of the aforementioned valve 23. The evaporator device outputs only fuel in vapor form, which enters the exhaust gas through the through opening in the hollow body. This hollow body is warmed on the one hand by the exhaust gas but also by the sheathed glow-plug element 40. The control of the heating is likewise effected as a function of the aforementioned parameters, so that a continuous addition of fuel in vapor form into the exhaust gas, in the requisite quantity, is assured.

Advantageously, the metering valve 23 is supplied from the fuel cycle of the fuel injection pump, which is necessary anyway for operating the engine. With the aid of the pressure regulator 20, the requisite low pressure is available without major additional expense. The metering valve may in a simple way be a low-pressure injection valve, which can easily be modified by reducing the outlet opening to a single hole. By the aforementioned control, which makes the reduction efficient but also prevents excess hydrocarbon from entering the environment in the form of emissions, only slight additional fuel consumption is needed to operate the reducing catalytic converter.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A device for re-treating exhaust gases of an internal combustion engine with a reducing catalytic converter (11) which serves to reduce NO$_x$ ingredients in the exhaust gases, in which an exhaust pipe (9) leads to the catalytic converter, an electrically controlled valve (23) is provided as a device for metering a reducing agent to be introduced into the stream of exhaust gas supplied to the catalytic converter (11), an evaporator device (26) is provided to evaporate the metered reducing agent before being introduced into the exhaust gas, the evaporator device (26) has a hollow body (41) which protrudes through a wall of the exhaust pipe (9) into the exhaust stream and communicates with the exhaust stream through at least one flow opening (43), a heating body (40) protrudes into an interior (44) of the hollow body, the heating body is spaced slightly apart from the inner wall of the hollow body, by which a reducing agent introduced into the remaining interior by the heating body is heated to a temperature of evaporation, and the hollow body (41) is a metal sheath, which for communication of its interior with the exhaust stream has a flow opening (43) on a face end.

2. The device of claim 1, in which the heating body is an electrically heated sheathed glow-plug element (40).

3. The device of claim 1, in which the hollow body (41) protrudes with a face end (42) into a core flow of the exhaust gas carried in the exhaust pipe.

4. The device of claim 2, in which the hollow body (41) protrudes with a face end (42) into a core flow of the exhaust gas carried in the exhaust pipe.

5. The device of claim 2, in which the sheathed glow-plug element (40) is replaceably joined to a securing element (29), which is inserted into the wall of the exhaust pipe (9) and by which a delivery conduit (47) that delivers the reducing agent to be evaporated, leads to the interior (44, 45) of the hollow body (41) secured on it.

6. The device of claim 3, in which a sheathed glow-plug element (40) is replaceably joined to a securing element (29), which is inserted into the wall of the exhaust pipe (9) and by which a delivery conduit (47) that delivers the reducing agent to be evaporated, leads to the interior (44, 45) of the hollow body (41) secured on it.

7. The device of claim 4, in which the sheathed glow-plug element (40) is replaceably joined to a securing element (29), which is inserted into the wall of the exhaust pipe (9) and by which a delivery conduit (47) that delivers the reducing agent to be evaporated, leads to the interior (44, 45) of the hollow body (41) secured on it.

8. The device of claim 5, in which the hollow body (41) and the heating body (40) protruding into the hollow body are disposed eccentrically to the axis of the securing element, which is embodied as a threaded connector (29) screwed into the wall of the exhaust pipe (9).

9. The device of claim 6, in which the hollow body (41) and the heating body (40) protruding into the hollow body are disposed eccentrically to the axis of the securing element, which is embodied as a threaded connector (29) screwed into the wall of the exhaust pipe (9).

10. The device of claim 7, in which the hollow body (41) and the heating body (40) protruding into the hollow body are disposed eccentrically to the axis of the securing element, which is embodied as a threaded connector (29) screwed into the wall of the exhaust pipe (9).

11. The device of claim 8, in which a retaining baffle (55) for the electrically controlled valve (23) is secured on the threaded connector (29) and communicates via a short connecting line (51) with the delivery conduit (47).

12. The device of claim 9, in which a retaining baffle (55) for the electrically controlled valve (23) is secured on the threaded connector (29) and communicates via a short connecting line (51) with the delivery conduit (47).

13. The device of claim 10, in which a retaining baffle (55) for the electrically controlled valve (23) is secured on the threaded connector (29) and communicates via a short connecting line (51) with the delivery conduit (47).

14. The device of claim 11, in which the retaining baffle (55) surrounds the valve (23) on three sides, with a jacket face located in the longitudinal direction of the valve and perpendicular to the circumferential wall of the exhaust pipe.

15. The device of claim 12, in which the retaining baffle (55) surrounds the valve (23) on three sides, with a jacket face located in the longitudinal direction of the valve and perpendicular to the circumferential wall of the exhaust pipe.

16. The device of claim 13, in which the retaining baffle (55) surrounds the valve (23) on three sides, with a jacket face located in the longitudinal direction of the valve and perpendicular to the circumferential wall of the exhaust pipe.

17. The device of claim 14, in which the retaining baffle (55) has detent means (54) by way of which the valve is connected to the retaining baffle.

18. The device of claim 15, in which the retaining baffle (55) has detent means (54) by way of which the valve is connected to the retaining baffle.

19. The device of claim 17, in which the threaded connector (29) has form-fitting faces, in particular a hexagon (50), by means of which it can be screwed into the exhaust pipe (9).

20. The device of claim 1, in which Diesel fuel is used as the reducing agent.

* * * * *